(12) United States Patent
Usui et al.

(10) Patent No.: US 9,797,357 B2
(45) Date of Patent: Oct. 24, 2017

(54) HIGH-PRESSURE FUEL SUPPLY PUMP HAVING ELECTROMAGNETICALLY-DRIVEN INTAKE VALVE

(71) Applicant: Hitachi Automotive Systems, Ltd., Hitachinaka-shi, Ibaraki (JP)

(72) Inventors: Satoshi Usui, Hitachinaka (JP); Kenichiro Tokuo, Hitachinaka (JP); Tatsuo Kawano, Hitachinaka (JP); Masahiko Hayatani, Hitachinaka (JP); Shingo Tamura, Hitachinaka (JP); Hiroyuki Yamada, Hitachinaka (JP); Katsumi Miyazaki, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 177 days.

(21) Appl. No.: 14/625,798

(22) Filed: Feb. 19, 2015

(65) Prior Publication Data

US 2015/0159611 A1 Jun. 11, 2015

Related U.S. Application Data

(63) Continuation of application No. 13/272,248, filed on Oct. 13, 2011, now Pat. No. 8,985,973.

(30) Foreign Application Priority Data

Oct. 15, 2010 (JP) ................. 2010-232072

(51) Int. Cl.
| | |
|---|---|
| F04B 53/10 | (2006.01) |
| F02M 59/36 | (2006.01) |
| F02M 63/00 | (2006.01) |
| F02M 37/00 | (2006.01) |
| F02M 37/04 | (2006.01) |

(52) U.S. Cl.
CPC ...... *F02M 59/366* (2013.01); *F02M 37/0023* (2013.01); *F02M 37/043* (2013.01);
(Continued)

(58) Field of Classification Search
CPC ..... F04B 53/10; F04B 7/0076; F02M 59/366; F02M 59/367
See application file for complete search history.

(56) References Cited

U.S. PATENT DOCUMENTS

| | | |
|---|---|---|
| 6,345,608 B1 | 2/2002 | Rembold et al. |
| 7,398,768 B2 | 7/2008 | Usui et al. |

(Continued)

FOREIGN PATENT DOCUMENTS

| | | |
|---|---|---|
| CN | 101275526 A | 10/2008 |
| DE | 198 34 121 A1 | 2/2000 |

(Continued)

OTHER PUBLICATIONS

Corresponding U.S. Appl. No. 13/272,943, filed Oct. 13, 2011.
(Continued)

*Primary Examiner* — Bryan Lettman
(74) *Attorney, Agent, or Firm* — Crowell & Moring LLP

(57) ABSTRACT

Responsiveness is improved in valve opening and valve closing of an electromagnetically driven intake valve unit in which a valve is provided on a pressurizing chamber side of a valve seat. The valve includes an annular abutting surface that abuts the valve seat to shut off a fuel intake passage and a bottomed cylindrical part provided at an inner peripheral part of the annular abutting surface. The bottomed cylindrical part is inserted into a fuel introduction hole formed in the valve housing inside the valve seat, and the outer surface of an end part of the bottomed cylindrical part is exposed to fuel in a low pressure fuel chamber provided upstream of the fuel introduction hole.

11 Claims, 13 Drawing Sheets

(52) U.S. Cl.
CPC ...... *F02M 59/367* (2013.01); *F02M 63/0017* (2013.01); *F02M 63/0035* (2013.01); *Y10T 137/86027* (2015.04)

(56) References Cited

U.S. PATENT DOCUMENTS

| | | | |
|---|---|---|---|
| 7,540,274 | B2 | 6/2009 | Yamada et al. |
| 8,257,067 | B2 | 9/2012 | Fukui et al. |
| 2006/0222518 | A1 | 10/2006 | Oda et al. |
| 2010/0166584 | A1* | 7/2010 | Fukui ............... F02M 59/366 417/505 |

FOREIGN PATENT DOCUMENTS

| | | |
|---|---|---|
| EP | 1 674 717 A1 | 6/2006 |
| EP | 1 701 031 A1 | 9/2006 |
| JP | 2002-521616 A | 7/2002 |
| JP | 2006-250086 A | 9/2006 |
| JP | 2006-307880 A | 11/2006 |
| JP | 2008-248788 A | 10/2008 |
| JP | 2009-203987 A | 9/2009 |
| JP | 2010-156264 A | 7/2010 |
| JP | 2010-169080 A | 8/2010 |
| JP | 2010-174752 A | 8/2010 |

OTHER PUBLICATIONS

European Search Report dated Feb. 15, 2012, (six (6) pages).
Japanese Office Action dated Nov. 5, 2013 (2 pages).
English-translation of Chinese Office Action dated Feb. 14, 2014 (three (3) pages).
Japanese final rejection dated Jun. 3, 2014 (three (3) pages).
Chinese Office Action dated Jul. 15, 2014 (five (5) pages).

* cited by examiner

HIGH-PRESSURE FUEL SUPPLY PUMP HAVING ELECTROMAGNETICALLY-DRIVEN INTAKE VALVE

This application is a continuation of U.S. application Ser. No. 13/272,248, filed, Oct. 13, 2011, which claims priority from Japanese Application No. 2010-232072, filed on Oct. 15, 2010, the disclosures of which are expressly incorporated by reference herein.

BACKGROUND OF THE INVENTION

1. Field of the Invention

The present invention relates to a high-pressure fuel supply pump having an electromagnetically-driven intake valve. The invention more particularly relates to a pump constructed in such a way that an electromagnetically-driven intake valve is constituted by a so-called outward open type valve provided with a valve on the side of a pressurizing chamber with respect to a valve seat.

2. Description of the Related Art

Conventionally this type of high-pressure fuel supply pump is constituted, as described in JP-2009-203987-A, for example, in such a way that a valve is formed by a cylindrical member and the valve is provided on the side of a pressurizing chamber (on the downstream side of the valve seat) rather than the valve seat.

SUMMARY OF THE INVENTION

For this reason, when a piston plunger starts to move toward a bottom dead center (intake step starts), the fuel passes between a valve and a valve seat and flows into the pressurization chamber. The fuel passage between the valve and the valve seat is in the shape of a circle. Therefore, in this fuel passage, a passage cross section shrinks suddenly in comparison with the fuel passage of the upper side of the valve seat. Therefore, in the upper side of the valve or the surround of the valve, pressure distribution is easy to become heterogeneous. Therefore the movement of the valve becomes unstable. As a result, there was a problem that high pressure discharge of the fuel was not stable. This phenomenon become problematic particularly in the case that where a quard-cam, for example, is used for supplying a large amount of fuel, because speed of the fuel via the valve and the fuel passage between the valve seat grows big.

It is an object of the present invention to improve valve opening response characteristics of an electromagnetically-driven intake valve having a valve on the side of a pressurizing chamber with respect to a valve seat.

In order to accomplish the aforesaid object, the present invention is constituted in such a way that a valve provided near the pressurizing chamber includes an annular abutting surface that abuts the valve seat to shut off a fuel intake passage and a bottomed cylindrical part provided at an inner peripheral part of the annular abutting surface, and the bottomed cylindrical part extends through a fuel introduction hole formed in the valve housing inside the valve seat such that the outer surface of an end part of the bottomed cylindrical part protrudes in a low pressure fuel chamber provided upstream of the fuel introduction hole and is exposed to a fuel flow.

In accordance with the present invention constituted as described above, when the piston plunger starts to move from the top dead center position to the bottom dead center and enters in an intake step, the fuel passes and flows between the inner peripheral surface of the fuel introduction hole and the peripheral surface of the protrusion of the valve and reaches the valve seat. Thus fuel flow rate is gradually fast over from the low pressure chamber to the front part and the rear part of the valve seat. As a result, since a low pressure portion is less generated upstream of the valve seat and static or dynamic fluid force for biasing the valve toward the valve opening direction acts over the entire outer surface of the valve, the valve opening speed can be made fast.

DESCRIPTION OF THE PREFERRED EMBODIMENTS

Figure 1:
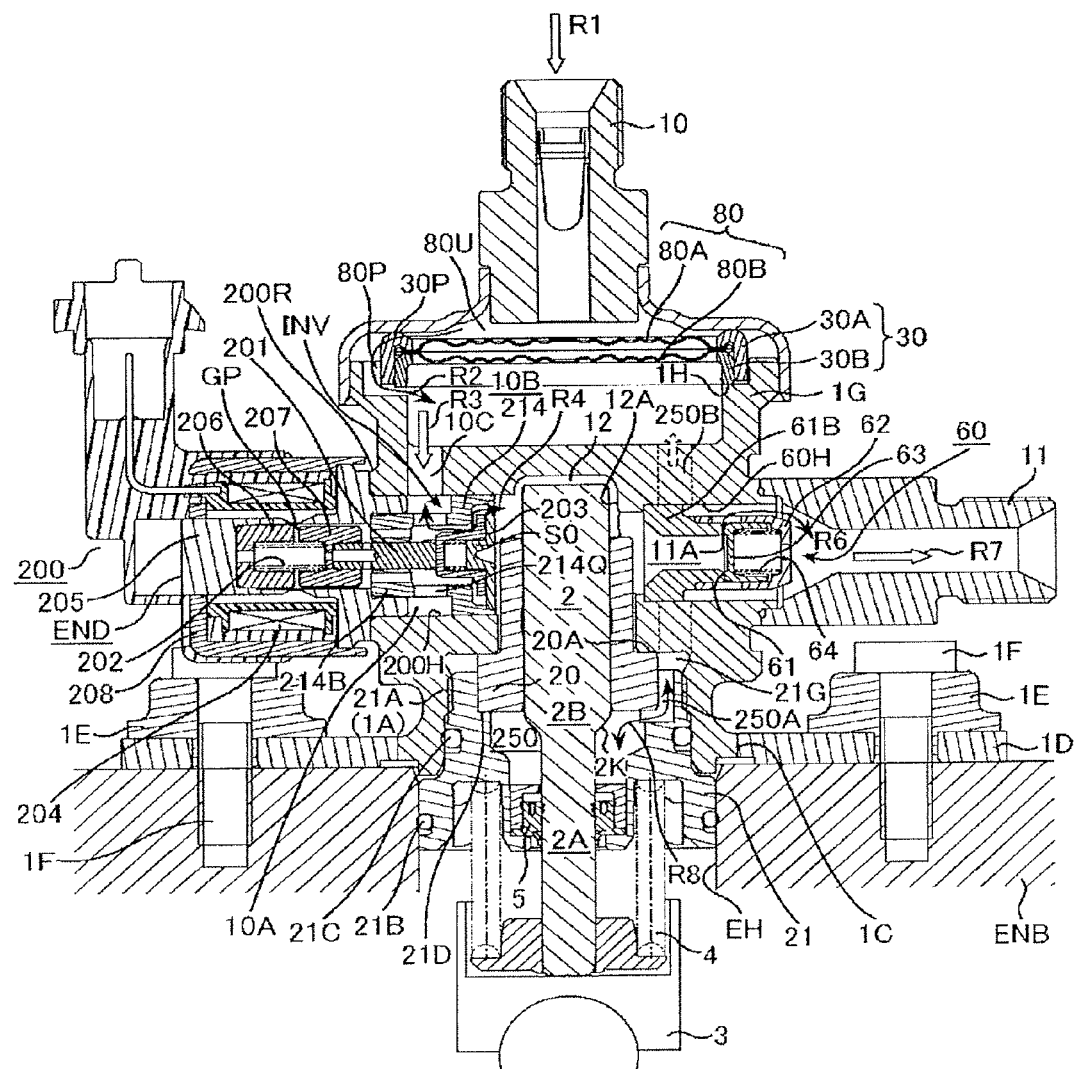
FIG. 1 is an entire longitudinal sectional view of a high-pressure fuel supply pump provided with an electrically-driven intake valve according to a first embodiment of the present invention.
Figure 1:
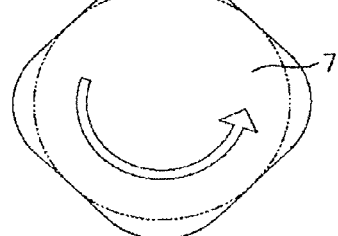

Referring now to the drawings, some embodiments of the present invention will be described as follows.

First Embodiment

Referring to FIGS. 1 to 7, a first embodiment of a high-pressure fuel supply pump according to the present invention will be described as follows. Since some detailed portions in FIG. 1 cannot be denoted with reference codes or numbers, the portions not denoted with any reference codes or numbers are described or illustrated in the enlarged views of FIGS. 2 to 7.

A pump housing 1 is provided with a recess part 12A forming a bottomed cylindrical space and having opened one end. A cylinder 20 is inserted into the recess part 12A at its opened end side. A part between the outer circumference of the cylinder 20 and the pump housing 1 is sealed with a press contacting part 20A. In addition, since a piston plunger 2 slidably contacts with the cylinder 20, a part between the inner peripheral surface of the cylinder 20 and the outer peripheral surface of the piston plunger 2 is sealed with fuel entering between their sliding contact surfaces. As a result, a pressurizing chamber 12 is defined among the extremity end of the piston plunger 2, the inner wall surface of the recess part 12A and the outer peripheral surface of the cylinder 20.

A cylindrical hole 200H is formed from the peripheral wall of the pump housing 1 toward the pressurizing chamber 12. An intake valve device INV included in an electromagnetically-driven intake valve mechanism 200 and a part of an electromagnetic driving mechanism EMD are inserted into the cylindrical hole 200H. A connecting surface 200R between the outer peripheral surface of the electromagnetically-driven intake valve mechanism 200 and the cylindrical hole 200H is connected by laser-welding to cause the inside part of the pump housing 1 to be sealingly closed against the surrounding atmosphere. The cylindrical hole 200H sealingly closed by fixing the electromagnetically-driven intake valve mechanism 200 functions as a low pressure fuel chamber 10A.

At a position opposing the cylindrical hole 200H with the pressurizing chamber 12 held is provided a cylindrical hole 60H extending from the peripheral wall of the pump housing 1 toward the pressurizing chamber 12. A discharging valve unit 60 is installed in the cylindrical hole 60H. The discharging valve unit 60 is formed with a valve seat 61 at its extremity end and further provided with a valve seat member 61B having a communication hole 11A serving as a discharging passage at its central part. To the outer periphery of the valve seat member 61B is fixed a valve holder 62 enclosing the circumference of the valve seat 61. Within the valve holder 62 are provided a valve 63 and a spring 64 for biasing the valve 63 against the valve seat 61 in its pushing direction. Opening part opposite to the pressurizing chamber side of the cylindrical hole 60H is provided with a discharging joint 11 fixed to the pump housing 1 by welding.

The electromagnetically-driven intake valve mechanism 200 includes a plunger rod 201 that is electromagnetically driven. The plunger rod 201 is provided with a valve 203 at its extremity end and the valve 203 is opposed to a valve seat 214S formed at a valve housing 214 provided at the end part of the electromagnetically-driven intake valve mechanism 200.

The plunger rod 201 has a plunger rod biasing spring 202 at other end. The plunger rod biasing spring 202 biases the plunger rod in such a direction that the valve 203 is away from the valve seat 214S. A valve stopper S0 is fixed to the extremity end inner peripheral part of the valve housing 214. The valve 203 is held in such a way that it can be reciprocated between the valve seat 214S and the valve stopper S0. A valve biasing spring S4 is provided between the valve 203 and the valve stopper S0. The valve 203 is biased by the valve biasing spring S4 in such a direction as one in which it is moved away from the valve stopper S0.

Although the valve 203 and the extremity end of the plunger rod 201 are biased by each of their springs in an opposite direction to each other, the plunger rod biasing spring 202 is constituted by a stronger spring. Thus the plunger rod 201 pushes against the valve 203 in opposition to the force of the valve biasing spring S4 in the direction in which the valve 203 is away from the valve seat (the right direction in the figure), resulting in that the plunger rod pushes the valve 203 against the valve stopper S0.

Figure 2:
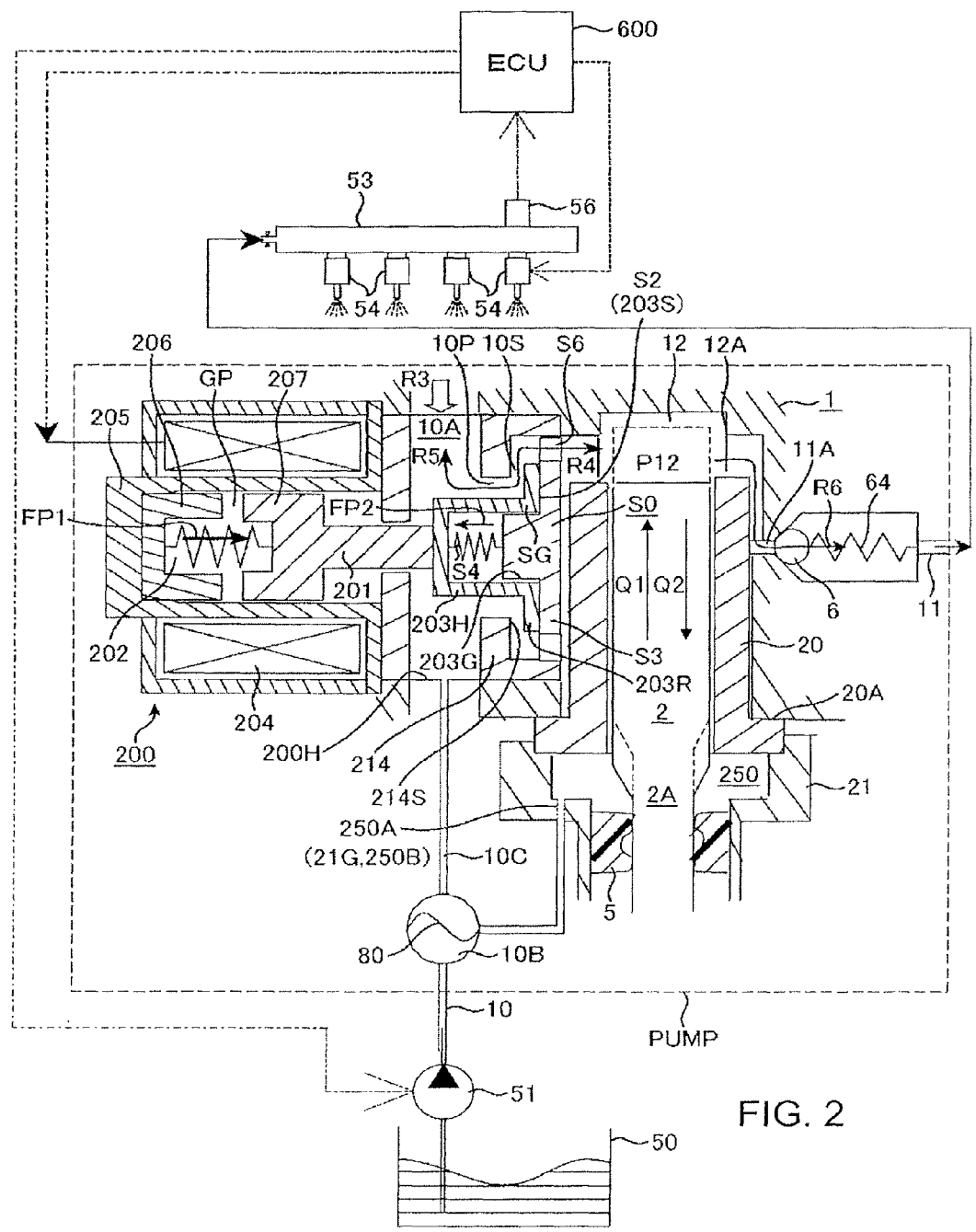
FIG. 2 is a system configuration view for showing one example of a fuel supply system using a high-pressure fuel supply pump of the present invention.
Figure 3A:
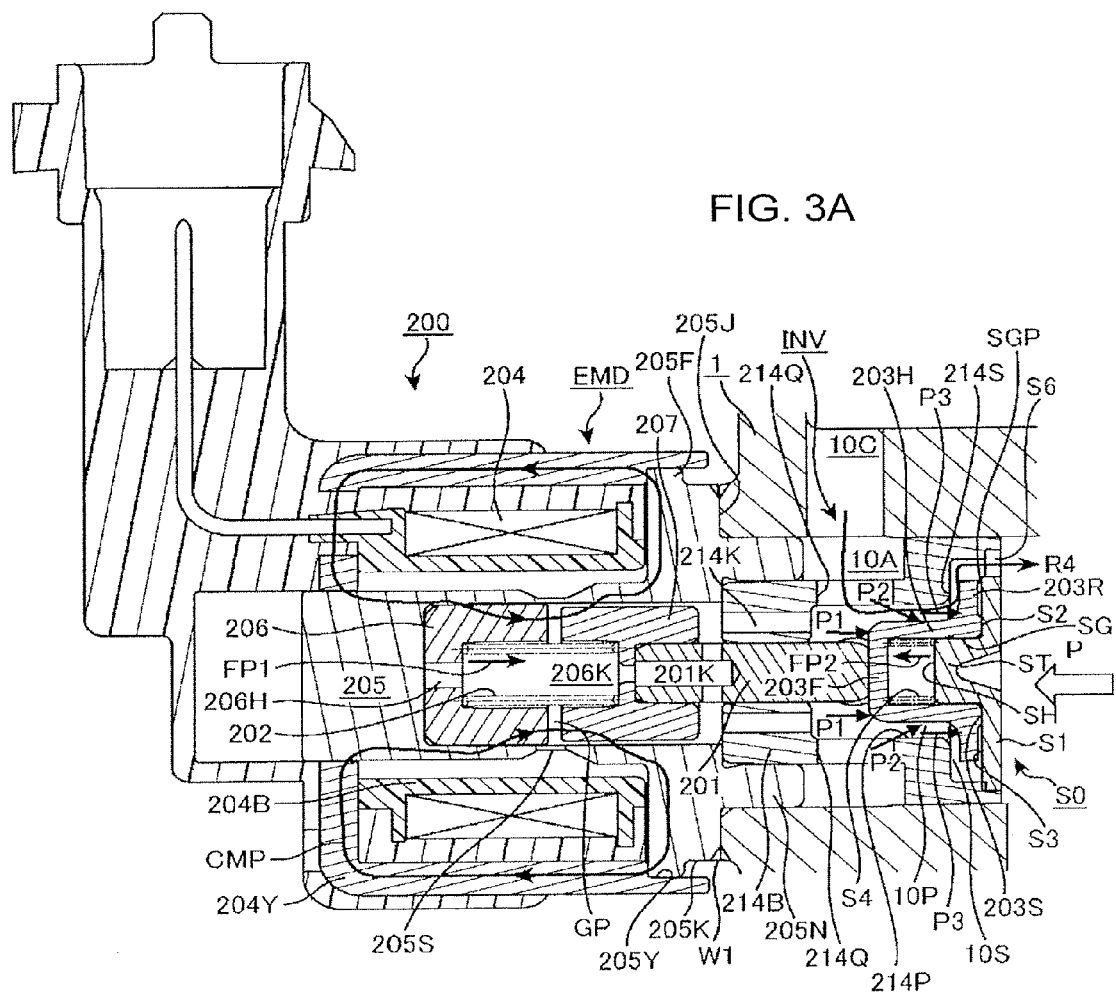
FIG. 3A is an enlarged sectional view of an electromagnetically-driven intake valve of the first embodiment of the present invention, showing a state at the time of fuel intake.

Therefore, the plunger rod 201 biases the valve 203 by the plunger rod biasing spring 202 in a direction where the valve 203 is opened through the plunger rod 201 when the electromagnetically-driven intake valve mechanism 200 is kept under its turned-off state (a solenoid coil 204 is not electrically energized). Accordingly, when the electromagnetically-driven intake valve mechanism 200 is kept under its turned-off state, the plunger rod 201 and the valve 203 are kept at a valve opening position as shown in FIGS. 1, 2 and 3A (details will be described later).

Fuel is guided by a low pressure pump 51 from a fuel tank 50 to an intake joint 10 serving as a fuel feeding port of the pump housing 1.

A plurality of injectors 54 and a pressure sensor 56 are attached to a common rail 53. The injectors 54 are installed according to the number of cylinders of an engine so as to inject to each of the cylinders high pressure fuel sent to the common rail 53 in response to a signal from an engine control unit (ECU) 600. In addition, a relief valve mechanism (not shown) incorporated in the pump housing 1 opens the valve when a pressure within the common rail 53 exceeds a predetermined value and returns surplus high pressure fuel to the upstream side of the discharging valve 6.

A lifter 3 provided at the lower end of the piston plunger 2 is pressingly contacted with a cam 7 by a spring 4. The piston plunger 2 is slidably held within the cylinder 20 and reciprocates by the cam 7 rotated by an engine cam shaft and the like to vary a volume within the pressurizing chamber 12. The lower end outer periphery part of the cylinder 20 is held by the cylinder holder 21 and the cylinder 20 is press-contacted to the pump housing 1 with a metal seal part 20A by fixing the cylinder holder 21 to the pump housing 1.

To the cylinder holder 21 is attached a plunger seal 5 for use in sealing the outer periphery of a small diameter part 2A formed at the lower end part of the piston plunger 2. An assembly of the cylinder 20 and the piston plunger 2 is inserted into the pressurizing chamber and a male threaded part 21A formed at the outer periphery of the cylinder holder 21 is screwed into a threaded part 1A of a female threaded part formed at the inner periphery of the open end part of the recess 12A of the pump housing 1. The cylinder holder 21 pushes the cylinder 20 against the pressurizing chamber side under a state in which a step part 21D of the cylinder holder 21 is engaged with the peripheral end edge of the cylinder 20 opposite the side of the pressurizing chamber, whereby a sealing step 20A of the cylinder 20 is pushed against and contacted with the pump housing 1 to form a seal part through their metallic contact.

An O-ring 21B seals between the inner peripheral surface of a fixing hole EH formed at an engine block ENB and the outer peripheral surface of the cylinder holder 21. An O-ring 21C seals between the inner peripheral surface of the recess 12A of the pump housing 1 opposite the side of the pressurizing chamber and the outer peripheral surface of the cylinder holder 21 at a position of the threaded part 21A (1A) opposite the side of the pressurizing chamber.

The fixing flange 1D fixed by the welding part 1C to the end part outer periphery of the pump housing 1 opposite the side of the pressurizing chamber is screw fixed to the engine block with a thread 1F through a thread fixing auxiliary sleeve 1E under a state in which the end outer periphery of the cylinder holder 21 is inserted into the fixing hole EH of the engine block ENB, whereby the pump is fixed to the engine block.

A damper chamber 10B is formed in the midway of a passage extending from the intake joint 10 to the low pressure fuel chamber 10A and a double-leaf metallic diaphragm type metallic diaphragm damper 80 is housed in the damper chamber under a state in which it is held by a damper holder 30 (upper damper holder 30A and lower damper holder 30B). The damper chamber 10B is formed by weld-connecting the lower end part of the cylindrical side wall of the damper cover 40 to the outer peripheral part of the annular recess formed at the outer wall part of the upper surface of the pump housing 1. In this embodiment, the intake joint 10 is fixed to the central part of the damper cover 40 by welding.

The double-leaf type metallic diaphragm damper 80 is constructed in such a way that a pair of upper and lower metallic diaphragms 80A and 80B are abutted against to each other and their outer peripheral portions are welded over their entire peripheries for inner sealing. The annular end edge at the lower end of the inner periphery of the upper damper holder 30A is present inside the welding part 80C of the double-leaf type metallic diaphragm damper 80 and abutted against the upper annular edge of the double-leaf type metallic diaphragm damper 80. The annular end edge at the upper end of the inner periphery of the lower damper holder 30 is present inside the welding part 80C of the double-leaf type metallic diaphragm damper 80 and abutted against the lower annular edge of the double-leaf type metallic diaphragm damper 80. In this manner, the double-leaf type metallic diaphragm damper 80 is held by the upper damper holder 30A and the lower damper holder 30B at the upper and lower surfaces of the annular edges.

The outer periphery of the damper cover 40 is constituted into a cylindrical form and fitted into a cylindrical part 1G of the pump housing 1. At this time, the inner peripheral surface of the damper cover 40 is abutted against the upper end annular surface of the upper damper holder 30A to cause the double-leaf type metallic diaphragm damper 80 to be pushed against and contacted with a step 1H of the pump housing 1 together with the lower damper holder 30, whereby the double-leaf type metallic diaphragm damper 80 is fixed in the damper chamber. Under this state, the periphery of the damper cover 40 is welded by laser beam and the damper cover 40 is connected to the pump housing 1 and fixed there.

An inert gas such as argon is filled in a hollow part formed by the double-leaf type metallic diaphragms 80A and 80B and the hollow part changes its volume in response to an outer pressure variation to provide a pulsation attenuation function. A fuel passage 80U between the double-leaf type metallic diaphragm damper 80 and the damper cover 40 is connected to a damper chamber 10B serving as a fuel passage through a passage 30P formed at the upper damper holder 30A and a passage 80P formed between the outer periphery of the upper damper holder 30A and the inner peripheral surface of the pump housing 1. The damper chamber 10B is communicated with a low pressure fuel chamber 10A of the electromagnetically-driven type intake valve 200 through a communication hole 10C formed in the pump housing 1 serving as a bottom wall of the damper chamber 10B.

A connecting part between a small-diameter part 2A of the piston plunger 2 and a large-diameter part 2B slidably contacted the cylinder 20 is connected through a conical surface 2K. Around the conical surface is formed a subsidiary fuel chamber 250 between the plunger seal and the lower end surface of the cylinder 20. The subsidiary fuel chamber 250 collects fuel spilled out of sliding contact surfaces between the cylinder 20 and the piston plunger 2.

An annular passage 21G is defined among the inner peripheral surface of the pump housing 1, the outer peripheral surface of the cylinder 20 and the upper end surface of the cylinder holder 21. The annular passage 21G has one end connected to the damper chamber 10B by a vertical passage 250A passing through the pump housing 1 and further connected to the subsidiary fuel chamber 250 through the fuel passage 250A formed in the cylinder holder 21. In this manner, the damper chamber 10B is communicated with the subsidiary fuel chamber 250 through the vertical passage 250B, the annular passage 21G and the fuel passage 250A.

When the piston plunger 2 moves up or down (reciprocates), a tapered surface 2K reciprocates within the subsidiary fuel chamber, so that the volumes of the subsidiary fuel chamber 250 change. If volumes of the subsidiary fuel chamber 250 increase, fuel flows from the damper chamber 10B into the subsidiary fuel chamber 250 through the vertical passage 250B, annular passage 21G and fuel passage 250A. If the volumes of the subsidiary fuel chamber 250 decrease, fuel flows from the subsidiary fuel chamber 250 into the damper chamber 10B through the vertical passage 250B, annular passage 21G and fuel passage 250A.

When the piston plunger 2 rises from the bottom dead center under a state in which the valve 203 is kept at a valve opened position (the coil 204 is kept non-energized), fuel sucked into the pressurizing chamber spills out of the valve 203 being opened into the low pressure fuel chamber 10A and flows to the damper chamber 10B through the communication hole 10C. In this manner, the damper chamber 10B is configured such that fuel from the intake joint 10, fuel from the subsidiary fuel chamber 250, fuel spilled out of the pressurizing chamber 12, and fuel from the relief valve (not shown) are merged to each other. As a result, fuel pulsations provided by each of the fuels are merged to each other at the damper chamber 10B and further absorbed by the double-leaf type metallic diaphragm damper 80.

In FIG. 2, a portion enclosed by a dotted line indicates the pump main body shown in FIG. 1. The electromagnetically driven type intake valve 200 is constituted in such a way that the inner peripheral side of the coil 204 formed in an annular shape is provided a bottomed cup-like yoke 205 also serving as the electromagnetic driving mechanism EMD body. The yoke 205 has a fixed core 206 at its inner peripheral part and the anchor 207 is housed with the plunger rod biasing spring 202 held therebetween. As shown in detail in FIG. 3A, the fixed core 206 is rigidly fixed to the bottom part of the yoke 205 by press-fitting. The anchor 207 is fixed to the end of the plunger rod 201 opposite the side of the valve by press-fitting and is opposed to the fixed core 206 through a magnetic clearance GP. The coil 204 is housed in the cup-shaped side yoke 204Y and the inner peripheral surface of the open end of the side yoke 204Y is press-fitted with the outer peripheral part of the annular flange 205F of the yoke 205 so that both parts may be fixed. A closed magnetic path CMP across the magnetic clearance GP is formed around the coil 204 by the yoke 205, side yoke 204Y, fixed core 206 and anchor 207. A portion of the yoke 205 facing the circumference of the magnetic clearance GP is formed to have a thin wall thickness, thereby forming a magnetic diaphragm 205S. With such an arrangement as above, a magnetic flux leaking through the yoke 205 is reduced and the magnetic flux passing through the magnetic clearance GP can be increased.

Figure 3B:
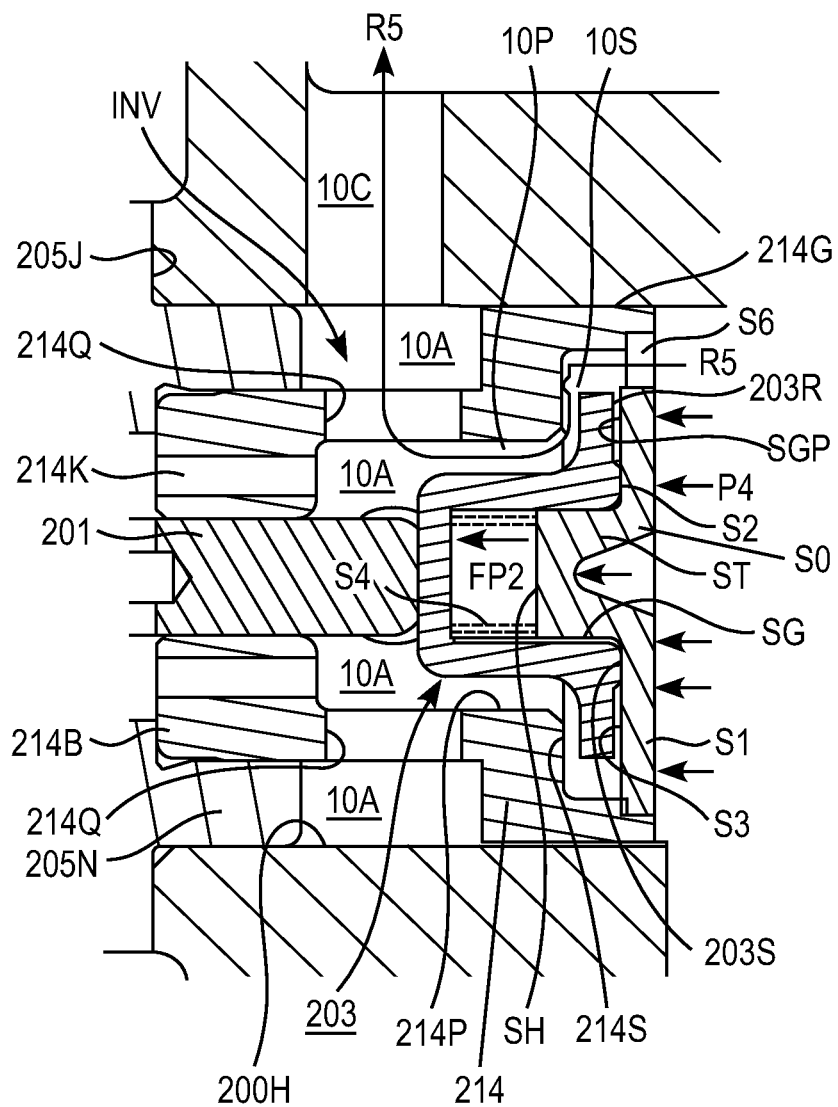
FIG. 3B is an enlarged sectional view of an electromagnetically-driven intake valve of the first embodiment of the present invention, showing a state at the time of fuel spillage.

As shown in FIGS. 3A and 3B, a valve housing 214 having a bearing 214B is press-fitted and fixed to the inner peripheral part of a cylindrical part 205G at the open end of the yoke 205 by press-fitting operation. The plunger rod 201 passes through this bearing 214B and extends up to the valve 203 provided at the inner peripheral part of the valve housing 214 opposite the side of the bearing 214B.

Figure 4A:
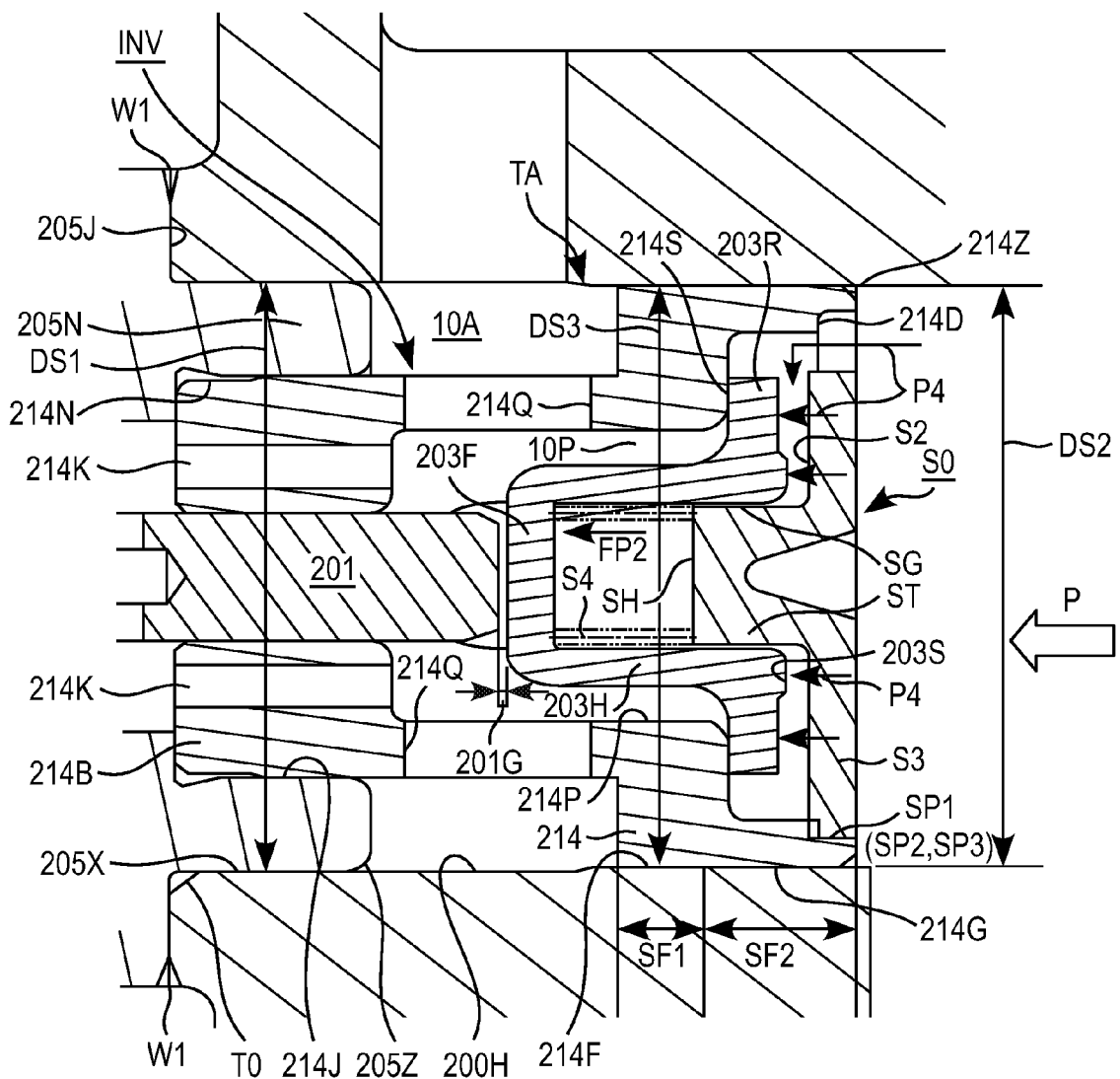
FIG. 4A is an enlarged sectional view of an electromagnetically-driven intake valve of the first embodiment of the present invention, showing a state at the time of fuel discharging.

As shown in an enlarged view of FIG. 4A, three press-fitting surfaces SP1-SP3 of the valve stopper S0 are press-fitted into a stepped annular inner peripheral surface 214D of the valve housing 214 opposite the side of the bearing 214B and fixed by a laser-welding. A width of the press-fitting step of the inner peripheral surface 214D and widths of the three press-fitting surfaces SP1-SP3 of the valve stopper S0 in the press-fitting direction are identical with each other in size.

A valve 203 is reciprocatably provided between the extremity end of the plunger rod 201 and the valve stopper S0 with a valve biasing spring S4 held therebetween. The valve 203 has an annular surface 203R of which one surface is opposed to a valve seat 214S formed at the valve housing 214 and the other surface of annular surface 203R is opposed to the valve stopper S0. The annular surface 203R has, at its central part, a bottomed cylindrical part that extends up to the extremity end of the plunger rod 201, with the bottomed cylindrical part being constituted by a bottom flat surface 203F and a cylindrical part 203H. The cylindrical part 203H passes through an opening part 214P formed at the valve housing 214 inside the valve seat 214S and protrudes in the low pressure fuel chamber 10A.

The extremity end of the plunger rod 201 is abutted against the surface of the flat surface 203F at the side end of the plunger rod of the valve 203 within the low pressure fuel chamber 10A.

The cylindrical part between a bearing 214B and an opening 214P of the valve housing 214 is provided with four fuel through holes 214Q equally spaced apart to each other. The four fuel through holes 214Q are communicated with an inner low pressure fuel chamber 10A and an outer low pressure fuel chamber 10A of the valve housing 214. A cylindrical fuel introduction passage 10P communicated with the annular fuel passage 10S between the valve seat 214S and the annular surface 203R is formed between the outer peripheral surface of the cylindrical part 203H and the peripheral surface of the opening 214P.

The valve stopper S0 has a protrusion ST provided with a cylindrical surface SG protruding to the bottomed cylindrical part of the valve 203 at the central part of the annular surface S3. The cylindrical surface SG serves as a guide part for use in guiding an axial stroke of the valve 203 (the cylindrical surface SG is also referred to as a valve guide SG).

The valve biasing spring S4 is held between a valve side end surface SH of the protrusion ST of the valve stopper S0 and the bottom surface of the bottomed cylindrical part of the valve 203.

When the valve 203 is guided by the cylindrical surface SG of the valve stopper S0 and strokes to its full-opened position, the annular protrusion 203S formed at the central part of the annular surface 203R of the valve 203 is contacted with an accepting surface S2 (width HS2) of the annular surface S3 (width HS3) of the valve stopper S0. At this time, an annular clearance SGP is defined around the annular protrusion 203S. This annular clearance SGP has a fast releasing function of allowing the fuel pressure P at the pressurizing chamber to be exerted to the valve 203 when the valve 203 starts to move toward the valve closing direction and causing the valve 203 to move away fast from the valve stopper S0.

Figure 4B:
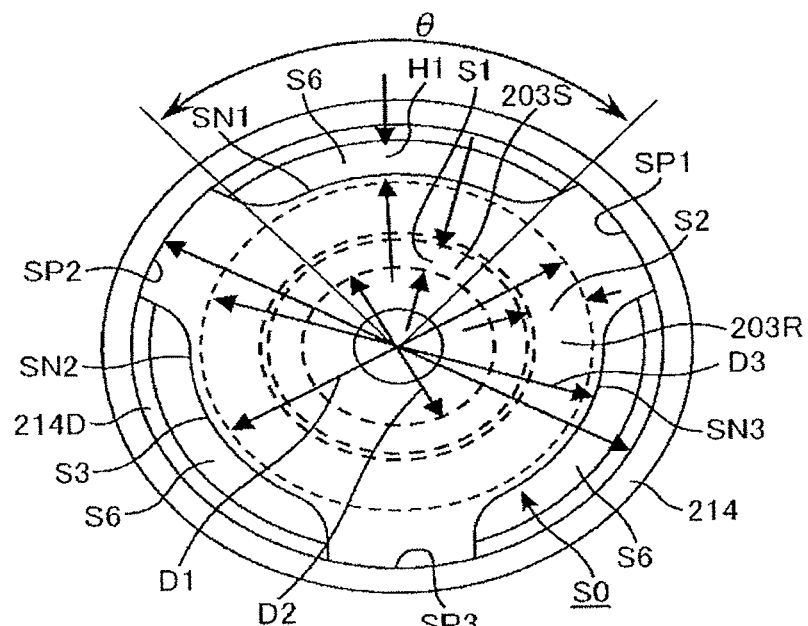
FIG. 4B is an enlarged sectional view of an electromagnetically-driven intake valve of the first embodiment of the present invention, showing a diagram taken in the direction of the arrow P of FIGS. 3A and 4A, and is a diagram taken in the direction of the arrow P of a valve.
Figure 4C:
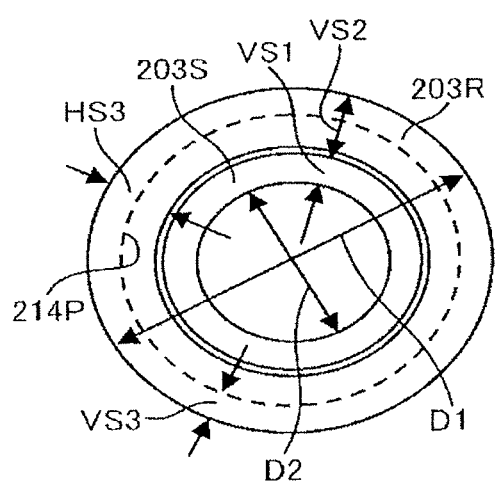
FIG. 4C is an enlarged sectional view of an electromagnetically-driven intake valve of the first embodiment of the present invention, showing a diagram taken in the direction of the arrow P of FIGS. 3A and 4A, and is a diagram taken in the direction of the arrow P of a stopper.

As shown in FIG. 4C, the valve stopper S0 is provided with press-fitting surfaces SP1-SP3 formed at three locations specifically spaced apart at an outer peripheral surface of the valve stopper S0. In addition, among the press-fitting surfaces SP1 (SP2, SP3) are provided recesses SN1-SN3 having a diametrical width size of H1 at an angle θ in a circumferential direction. The plurality of press-fitting surfaces SP1-SP3 of the valve stopper S0 are press-fitted and fitted into the inner peripheral surface of the valve housing 214 at the downstream side of the valve seat 214S. Three valve seat downstream side fuel passages S6 with a width H1 over an angle θ in a circumferential direction between the peripheral surface of the valve stopper S0 and the inner peripheral surface of the valve housing 214 are formed between the press-fitting portions. Since the valve seat downstream side fuel passages S6 are formed at a further outside of the outer peripheral surface of the valve 203 as fuel passages having a large area, the passage area can be made larger than the annular fuel passage 10S formed at the valve seat 214S. As a result, since passage resistance is not created to the fuel flowing into the pressurizing chamber or spilling of fuel from the pressurizing chamber, fuel flow becomes smooth.

In FIG. 4B, the valve 203 has an outer peripheral surface diameter D1 slightly smaller than a diameter D3 of the recess of the valve stopper S0. As a result, in FIG. 3B, under a spilled state in which the fuel flows along the fuel stream R5 from the pressurizing chamber to the low pressure fuel chamber and the damper chamber 10B, static and dynamic fluid forces of fuel at the pressurizing chamber 12 indicated by an arrow P4 is less exerted on the annular surface 203R of the valve 203. Accordingly, since the force of the plunger rod biasing spring 202 for applying a force pushing the valve 203 under this state to the valve stopper S0 need not overcome a fluid force P4, it is possible to use a weak spring accordingly. As a result, the electromagnetic force to be applied is low when the anchor 207 is magnetically attracted to the fixed core 216 in opposition to the force of the plunger rod biasing spring 202 at a valve closing timing of the valve 203 and the plunger rod 201 is pulled away from the valve 203 as shown in FIG. 4A. This means that it is possible to reduce the number of winding of the coil 204 and correspondingly the electromagnetic driving mechanism EMD can be made compact.

As shown in FIGS. 3A, 3B, 4A, 4B and 4C, a diameter D1 of the annular surface 203R of the valve 203 is set larger 1.5 to 3 times than a diameter D2 of the inner peripheral surface accepting a valve guide formed by the cylindrical surface SG of the protrusion ST of the valve stopper S0 provided at its central part. In addition, a width VS1 in a radial direction of the annular protrusion 203S contacted an accepting surface S2 (with a width HS2) of the annular surface S3 (with a width HS3) of the valve stopper S0 formed outside it is set smaller than a width VS2 of the annular clearance SGP formed outside it. Further, additionally, the valve seat 214 is formed at a part with a width VS3 inside the outer periphery of the annular surface 203R of the valve 203. As a result, since an action force of fuel flowing from the low pressure fuel chamber 10A when the valve 203 is opened and an action force of fuel exerted from the pressurizing chamber to the valve when the valve 203 is closed may act uniformly in a well-balanced state in a radial direction of the valve 203. Looseness of the valve 203 in its radial direction and a force for inclining it in a slanting direction with respect to a central axis of the valve 203 are reduced and a valve opening or closing operation of the valve 203 is carried out smoothly owing to the synergetic effect with guiding of the cylindrical surface SG of the valve stopper S0. This effect is an important effect in the case where a valve having a diameter of several millimeters and light weight of a few grams is used at a location where a flow rate is fast and a flow direction is reversed for a short period of time.

As shown in FIG. 4A, since the plunger rod 201 in this embodiment is attracted in a leftward direction as viewed in this figure by an electromagnetic force at a spontaneous time when the valve 203 is closed, its extremity end is away from the flat surface 203F of the valve 203 and a clearance 201G is formed between the plunger rod 201 and the flat surface 203F. In this case, since fuel is supplemented from the damper chamber 10B and the low pressure fuel chamber 10A only by an increased volume in the subsidiary fuel chamber 250 due to the fact that the piston plunger 2 is being lifted from the bottom dead center, the pressure in the low pressure fuel chamber 10A becomes correspondingly decreased more than the case in which the volume of the subsidiary fuel chamber 250 is decreased. Since this decreased pressure may also be exerted on the area where the flat surface part 203F of the valve 203 had been contacted with the extremity end of the plunger rod 201, a pressure difference between the pressurizing chamber and the low pressure chamber becomes great and the valve 203 closes more rapidly.

Additionally, the intake valve device INV is inserted in the insertion hole 200H with a diameter of DS1. The insertion hole 200H has a tapered part TA in the midway in the inserting direction. A diameter DS3 on side of the pressurizing chamber with respect to the tapered part TA is made smaller than the diameter DS1. An outer diameter of from 214F to 214G of the cylindrical portion of the valve housing 214, which is positioned at the extremity end of the intake valve device INV, is set such that the outer diameter at the segment SF2 of the outer periphery of the extremity end (cylindrical part 214G) is smaller than that of the segment SF1 (cylindrical part 214F). At the segment SF1, the outer diameter of the cylindrical part 214F is larger than the diameter DS1 of the insertion hole 200H. The intake valve device INV is fitted to the insertion hole 200H of the pump housing 1 through close fitting. The outer diameter of the cylindrical part 214G at the segment SF2 is smaller than the diameter DS1 of the insertion hole 200H and the intake valve device INV is loosely fitted at this segment. This reason is as follows. When the intake valve device INV is inserted into the insertion hole 200H, the extremity end of the valve housing 214 is automatically centered at the tapered part TO of the inlet part to thereby facilitate insertion operation. Further, the intake valve device INV is prevented from being inserted under an inclined state while an automatic centering operation is carried out at the inner tapered part TA. With this arrangement, a yield at the time of automatic assembling operation is improved. In addition, fluid sealing at the pressurizing chamber 12 and at the low pressure fuel chamber 10A are accomplished in the close fitting part (segment SF1) of the cylindrical part 214F only by the press-fitting operation, thereby improving operability in automatic assembling operation.

When associated dimensions are set such that an extremity end edge 205Z of the yoke 205 is inserted into the tapered part TO just after the extremity end edge of the valve housing 214 is inserted into the tapered part TA, centering action at the time of assembly can be carried out smoothly. That is, the automatic centering is carried out by the electromagnetic driving mechanism EMD upon completion of the centering of the intake valve device INV, so that the centering action of the intake valve device INV does not interfere with that of the electromagnetic driving mechanism EMD. As a result, the centering operation during automatic assembling operation can be carried out smoothly and assembling failure is reduced.

The outer diameter of the extremity end of the yoke 205 inserted into the insertion hole 200H is set to be smaller than the inner diameter DS1 of the insertion hole 200H so that loose fitting is provided between the extremity end of the yoke 205 and he insertion hole 200H. This provides the following effect. An insertion force for inserting the yoke 205 having the intake valve device INV fitted at its extremity end is reduced as much as possible to thereby prevent an excessive force from being exerted on the intake valve device INV when the electromagnetic driving mechanism EMD is inserted. Further an effect of reducing the time it takes for the automatic insertion operation is exhibited. Upon completion of insertion of the yoke 205 into the insertion hole 200H, a connecting end surface 205J of the yoke 205 is abutted against the fixing surface of the pump housing 1. The entire circumference of the connecting part W1 is laser welded under this state to make a sealed inside part and at the same time, the electromagnetic driving mechanism EMD is fixed to the pump housing 1.

The outer diameter of the bearing 214B of the valve housing 214 is set such that that the outer diameter of a press-fitting part 214J at an outer periphery of the valve 203 of the bearing 214B is larger than the outer diameter of the extremity end 214N opposite the side of the valve 203. This provides an effect of attaining an automatic centering when the bearing 214B is press-fitted to the inner peripheral surface of the cylindrical protrusion 205N formed at the extremity end of the yoke 205. The bearing 214B is formed with a plurality of fuel through holes 214K. When the anchor 207 reciprocates, fuel flows in or out through the fuel through holes 214K, thereby allowing the anchor 207 to smoothly operate.

Further, the fuel flows in or out through the fuel through hole 201K formed in the plunger rod 201, a space 206K between the fixed core 206 having the plunger rod biasing spring 202 housed therein and the anchor 207 and around the anchor 207 and flows in or flows out. With this arrangement as above, the operation of the anchor 207 is carried out more smoothly. If the fuel through hole 201K is not present, the space 206K might be completely closed when the fixed core 206 and the anchor 207 are in contact. While the prior art has a problem that under this state, when the anchor 207 and the plunger rod 201 starts to perform a valve opening operation at the right side in the figure by the plunger rod biasing spring 202, the pressure within the space 206K is decreased spontaneously to cause a delay in valve opening operation and the valve opening motion becomes unstable, the aforesaid configuration has resolved such problem.

Referring now to FIGS. 1, 2, 3A and 3B, and FIGS. 4A and 4B, the operation of a first embodiment will be described as follows.

<Fuel Intake State>

Referring to FIGS. 3A and 3B, a fuel intake state will be described. At an intake stroke where the piston plunger 2 descends from the top dead center position shown by a dotted line in FIG. 2 toward the direction indicated by an arrow Q2, the coil 204 is kept de-energized. A biasing force SP1 of the plunger rod biasing spring 202 biases the plunger rod 201 toward the valve 203 as indicated by an arrow. In turn, a biasing force SP2 of the valve biasing spring S4 biases the valve 203 toward a direction indicated by an arrow. Since the biasing force of the plunger rod biasing spring 202 is set to be larger than the biasing force SP2 of the valve biasing spring S4, the biasing forces of both springs at this time bias the valve 203 toward a valve opening direction. Additionally, the valve 203 may accept a force in a valve opening direction by a pressure difference between a static pressure P1 of fuel exerting on the outer surface of the valve 203 represented by the flat surface 203F of the valve 203 positioned within the low pressure fuel chamber 10A and a pressure P12 of fuel within the pressurizing chamber. Further, a fluid frictional force P2 generated between a fuel flow flowing into the pressurizing chamber 12 along an arrow R4 through a fuel introduction passage 10P and the peripheral surface of the cylindrical part 203H of the valve 203 biases the valve 203 toward a valve opening direction. Further, a dynamic pressure P3 of a fuel flow passing through the annular fuel passage 10S formed between the valve seat 214S and the annular surface 203R of the valve 203 acts against the annular surface 203R of the valve 203 to bias the valve 203 toward the valve opening direction. When the piston plunger 2 starts to descend under these biasing forces, the several-grams-valve 203 rapidly opens and performs its stroking action until it strikes against the stopper ST.

The valve seat 214S is formed more outside in a diametrical direction than the cylindrical part 203H of the valve 203 and the fuel introduction passage 10P. With such an arrangement as above, it becomes possible to enlarge an area on which P1, P2 and P3 may exert and further it is possible to make the valve opening speed of the valve 203 fast.

At this time, the plunger rod 201 and the anchor 207 have a more slight delay in stroke in a rightward direction as viewed in the figure than the valve opening speed of the valve 203 since the surroundings of the plunger rod 201 and the anchor 207 are filled with the staying fuel and the frictional force with the bearing 214B exerts. Since a slight clearance is formed between the extremity end surface of the plunger rod 201 and the flat surface 203F of the valve 203, the valve opening force applied from the plunger rod 201 is spontaneously decreased. However, since the pressure P1 of fuel within the low pressure chamber 10A exerts on the clearance without delay, the reduction in the valve opening force applied from the plunger rod 201 (plunger rod biasing spring 202) is compensated for by a fluid force applied in a direction in which the valve 203 is opened. In this manner, since both static pressure and dynamic pressure of fluid exerts over the entire surface of the low pressure fuel chamber 10A of the valve 203 when the valve 203 is opened, the valve opening speed is made fast.

When the valve 203 is opened, the valve 203 is guided on the inner peripheral surface of the cylindrical part 203H of the valve 203 by the valve guide formed by the cylindrical surface SG of the protrusion ST of the valve stopper S0, and performs a smooth stroke without displacement in a radial direction. The cylindrical surfaces SG forming the valve guide are formed on an upstream side and a downstream side with the valve seat 214S arranging surface held. This enables the stroke of the valve 203 to be sufficiently supported, but also enables a dead space at the inner peripheral side of the valve 203 to be effectively utilized. Thus it is possible to shorten the dimensions in an axial direction of the intake valve device INV.

In addition, since the valve biasing spring S4 is provided between the end surface SH of the valve stopper S0 and the bottom surface of the flat surface 203F of the valve 203 (the side of the valve stopper S0), the valve 203 and the valve biasing spring S4 can be provided inside the opening 214P while the passage area of the fuel introduction passage 10P formed between the opening 214P and the cylindrical part 203H of the valve is sufficiently assured. In addition, since the valve biasing spring S4 can be provided under an effective utilization of the dead space at the inner peripheral side of the valve 203 positioned inside the opening part 214P forming the fuel introduction passage 10P, it is possible to shorten the dimensions in an axial direction of the intake valve device INV.

The valve 203 has the valve guide (SG) at its central part. The valve 203 has the annular protrusion 203S that contacts with an accepting surface S2 of the annular surface S3 of the valve stopper S0 just near the outer periphery of the valve guide (SG). Further, a valve seat 214S is formed at a position outward in a radial direction thereof. The annular clearance SGP further extends up to a part outward in the radial direction. A fuel passage S6 formed in the inner peripheral surface of the valve housing is formed outside the annular clearance SGP (that is, the outer peripheral sides of the valve 203 and the valve stopper S0). Since the fuel passage S6 is formed at an outside part in a radial direction of the valve seat 214S, advantageously the sufficiently wide fuel passage S6 can be made. This can restrict the event in which the flow rate of intake fuel is remarkably fast at the time of intake operation to cause a sonic phenomenon and the occurrence of cavitation within the fuel passage S6 and the pressurizing chamber. As a result, it is possible to restrict occurrence of erosion of metallic edges in the fuel passage S6 and the pressurizing chamber.

In addition, since the annular protrusion 203S that is contacted with the accepting surface S2 of the valve stopper is provided inside the annular clearance SGP and inside the valve seat 214S, it is possible to perform a fast action of the fluid pressure P4 from the pressuring chamber to the annular clearance SGP at the time of valve closing operation described later, thereby increasing a valve closing speed when the valve 203 is pushed against and contacted with the valve seat 214S.

<State of Fuel Spill>

Referring now to FIGS. 2 and 3B, the state of fuel spill will be described as follows. The piston plunger 2 starts to rise in a direction of arrow Q1 from the bottom dead center position. In this time the coil 204 is kept de-energized state, so that a part of the fuel sucked once into the pressurizing chamber 12 spills (over-flow) to the low pressure fuel chamber 10A through the fuel passage S6, annular fuel passage 10S and fuel introduction passage 10P. When the fuel flow in the fuel passage S6 is changed from the direction of arrow R4 to the direction of arrow R5, the fuel flow is spontaneously stopped and the pressure in the annular clearance SGP is increased and at this time the plunger biasing spring 202 pushes the valve 203 against the valve stopper S0. Rather, under the force of fluid pushing the valve 203 against the valve stopper S0 with a dynamic pressure of fuel flowing into the annular passage 10S of the valve seat 214S and the sucking effect of a fuel flow flowing at the outer periphery of the annular clearance SGP, the force of fluid is exerted such that the valve 203 and the valve stopper S0 are attracted each other, whereby the valve 203 is securely pushed against and contacted with the valve stopper S0.

At the moment in which the fuel flow is changed over to the direction R5, the fuel within the pressurizing chamber 12 flows into the low pressure fuel chamber 10A in order of the fuel passage S6, annular passage 10S and fuel introduction passage 10P. In this case, the fuel passage sectional area of the annular fuel passage 10S is set to be smaller than the fuel flow passage sectional areas of the fuel passage S6 and the fuel introduction passage 10P. That is, the sectional area of the fuel passage is set to the least value in the annular fuel passage 10S. In doing so, while a pressure loss takes place in the annular fuel passage 10S and a pressure within the pressurizing chamber 12 starts to increase, the fluid pressure P4 is accepted by the annular surface of the valve stopper S0 on the pressurizing chamber side and the valve 203 is less subject to the pressure.

Fuel at the annular clearance SGP under the state of spill flows from the low pressure fuel chamber 10A to the damper chamber 10B through four fuel through holes 214Q. In turn, the piston plunger 2 rises to cause a volume of the subsidiary fuel chamber 250 to be increased, so that a part of the fuel is fed from the damper chamber 10B to the subsidiary fuel chamber 250 by the fuel stream in a lower arrow direction of the arrow R8 passing through a vertical passage 250B, an annular passage 21G and a fuel passage 250A. In this manner, since cold fuel is supplied to the subsidiary fuel chamber, the sliding portions of the piston plunger 2 with the cylinder 20 are cooled.

<State of Fuel Discharging>

Referring to FIG. 4, the state of fuel discharging will be described as follows. When the coil 204 is electrically energized under the aforesaid fuel spilled state in response to an instruction from the engine control unit ECU, the closed magnetic path CMP is generated as shown in FIG. 3A. When the closed magnetic path CMP is formed, in the magnetic clearance GP a magnetic attraction force is generated between the surfaces where the fixed core 206 faces the anchor 207. This magnetic attraction force overcomes the biasing force of the plunger rod biasing spring 202 to attract the anchor 207 and the plunger rod 201 fixed to the anchor 207 toward the fixed core 205. At this time, the fuel in the magnetic clearance GP and the chamber 206k for storing the plunger biasing spring 202 is discharged from the fuel passage 214K to the low pressure passage through a part around the anchor 207. With this arrangement as above, the anchor 207 and the plunger rod 201 are smoothly displaced toward the fixed core 206 side. When the anchor 207 is contacted with the fixed core 206, the anchor 207 and the plunger rod 201 stop their motion.

Since the plunger rod 201 is attracted toward the fixed core 206 and the biasing force pushing the valve 203 toward the valve stopper S0 is eliminated, the valve 203 is biased in a direction in which it is away from the valve stopper S0 by the biasing force of the valve biasing spring S4, and the valve 203 starts to perform a valve closing motion. At this time, the pressure in the annular clearance SGP positioned at the outer periphery of the annular protrusion part 203S becomes higher than the pressure at the low pressure fuel chamber 10A side as the pressure in the pressurizing chamber 12 is increased, whereby the valve closing action of the valve 203 is assisted. The valve 203 is contacted with the seat 214S to become a valve closed state. This state is shown in FIG. 4A. The piston plunger 2 subsequently rises, a volume of the pressurizing chamber 12 is decreased, and when a pressure within the pressurizing chamber 12 is increased. In this time the discharging valve 63 of the discharging valve unit 60 overcomes the force provided by the discharging valve biasing spring 64, as shown in FIG. 1 and FIG. 2, is away from the valve seat 61 and the fuel is discharged from the discharging passage 11A through discharge joint 11 in the directions of arrows R6 and R7.

In this manner, the annular clearance SGP has an effect of assisting the valve closing motion of the valve 203. While there is a problem that the valve closing motion is not stabilized only with use of the valve biasing spring S4 because of too lower valve closing force for the intake valve, this embodiment can resolve such problem.

At a spontaneous time in which the valve 203 is contacted with the seat 214S to assume a complete valve closed state, the plunger rod 201 is completely attracted toward the fixed core 206 and the extremity end of the plunger rod 201 is spaced apart from the end surface of the low pressure fuel chamber 10A to form the clearance 201G. With this arrangement as above, since the valve 203 does not accept a force applied in a valve closing direction by the plunger rod 201 during valve closing motion of the valve 203, the valve closing operation is made fast. In addition, since when the valve 203 performs the valve closing operation, the valve 203 does not strike against the plunger rod 201 and no striking sound is generated, a silent valve mechanism can be attained.

After the valve 203 is completely closed, the pressure in the pressurizing chamber 12 is increased and a high pressure discharging is started, the electrical energization for the coil 204 is turned off. The magnetic attraction force generated between the opposing surfaces of the fixed core 206 and the anchor 207 is eliminated and the anchor 207 and the plunger 201 start to move toward the valve 203 side by the biasing force of the plunger rod biasing spring 202 and this motion is stopped when the plunger rod 201 is contacted with the bottom part flat surface 203F of the valve 203. Since the valve closing force provided by the pressure in the pressurizing chamber 12 is already sufficiently higher than the acting force of the plunger rod biasing spring 202, even if the plunger rod 201 pushes against the surface of the low pressure fuel chamber 10A of the valve 203, the valve 203 is not opened. This state becomes a preparing action in which the plunger rod 201 biases the valve 203 toward the valve opening direction at the spontaneous moment in which the piston plunger 2 is changed from the top dead center to the descending direction Q2. The clearance 201G is a several tens to several hundreds micron order slight clearance and the valve 203 is biased by the pressure in the pressurizing chamber 12 and the valve 202 is a rigid member. Therefore, the striking sound generated when the plunger rod 201 strikes against the valve 203 does not become noise because its frequency is higher than the audible frequency and its energy is also low.

Highly pressurized fuel can be adjusted by controlling a timing at which the coil 204 is electrically energized in response to an instruction from the engine control unit ECU. If the electrical energization timing is controlled in such a way that the valve 203 performs a valve closing operation just after the piston plunger 2 is changed from the bottom dead center to the top dead center to perform a rising motion, then an amount of fuel spilled out is decreased and an amount of fuel discharged under high pressure is increased. If the electrical energization timing is controlled in such a way that the valve 203 performs a valve closing operation just before the piston plunger 2 is changed in operation from the top dead center to the bottom dead center to perform a descending operation, then an amount of spilled-out fuel is increased and an amount of fuel discharged in high pressure is reduced.

Figure 5:
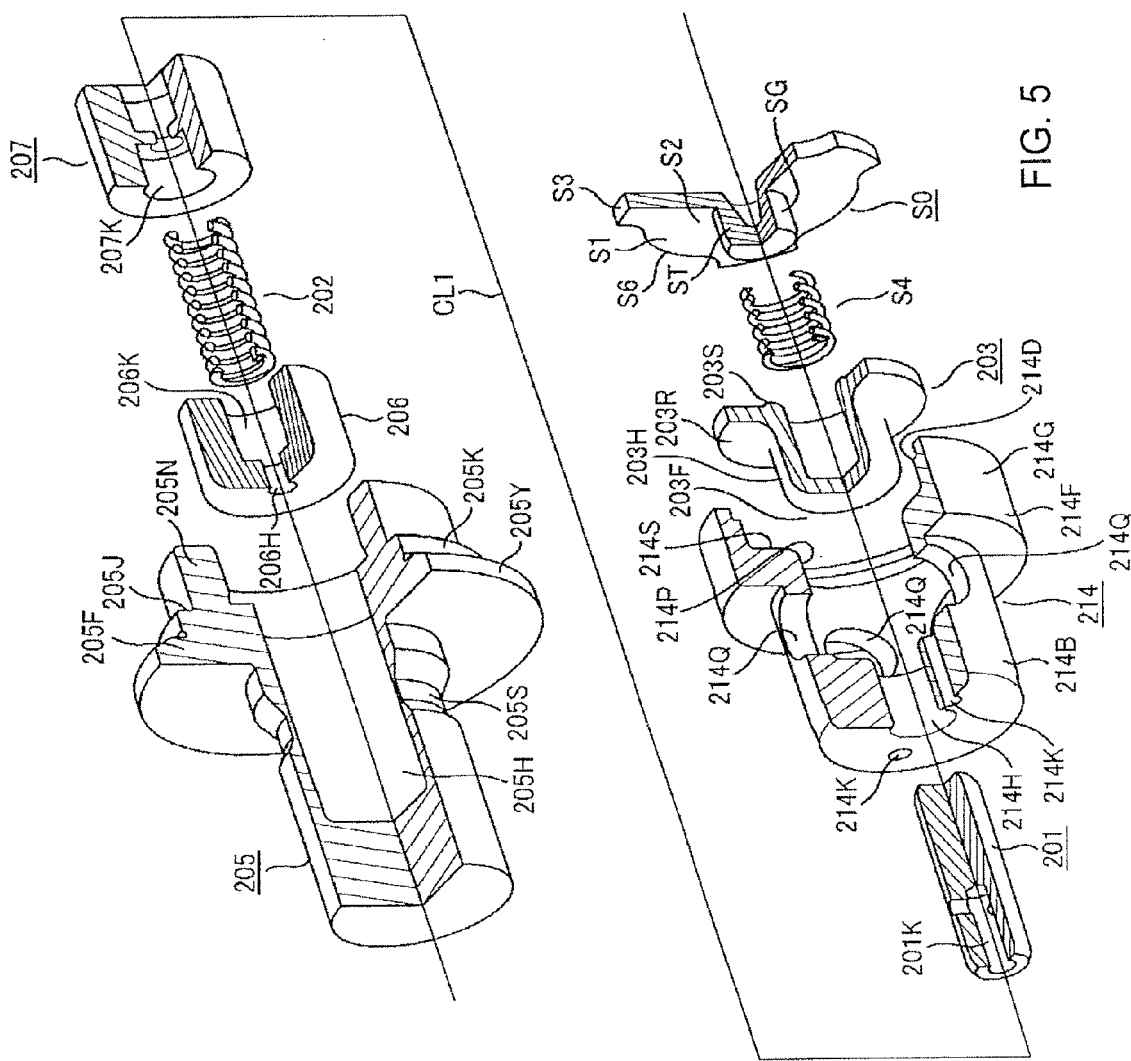
FIG. 5 is a partial sectional exploded perspective view of an electromagnetically-driven intake valve of the first embodiment of the present invention.
Figure 6:
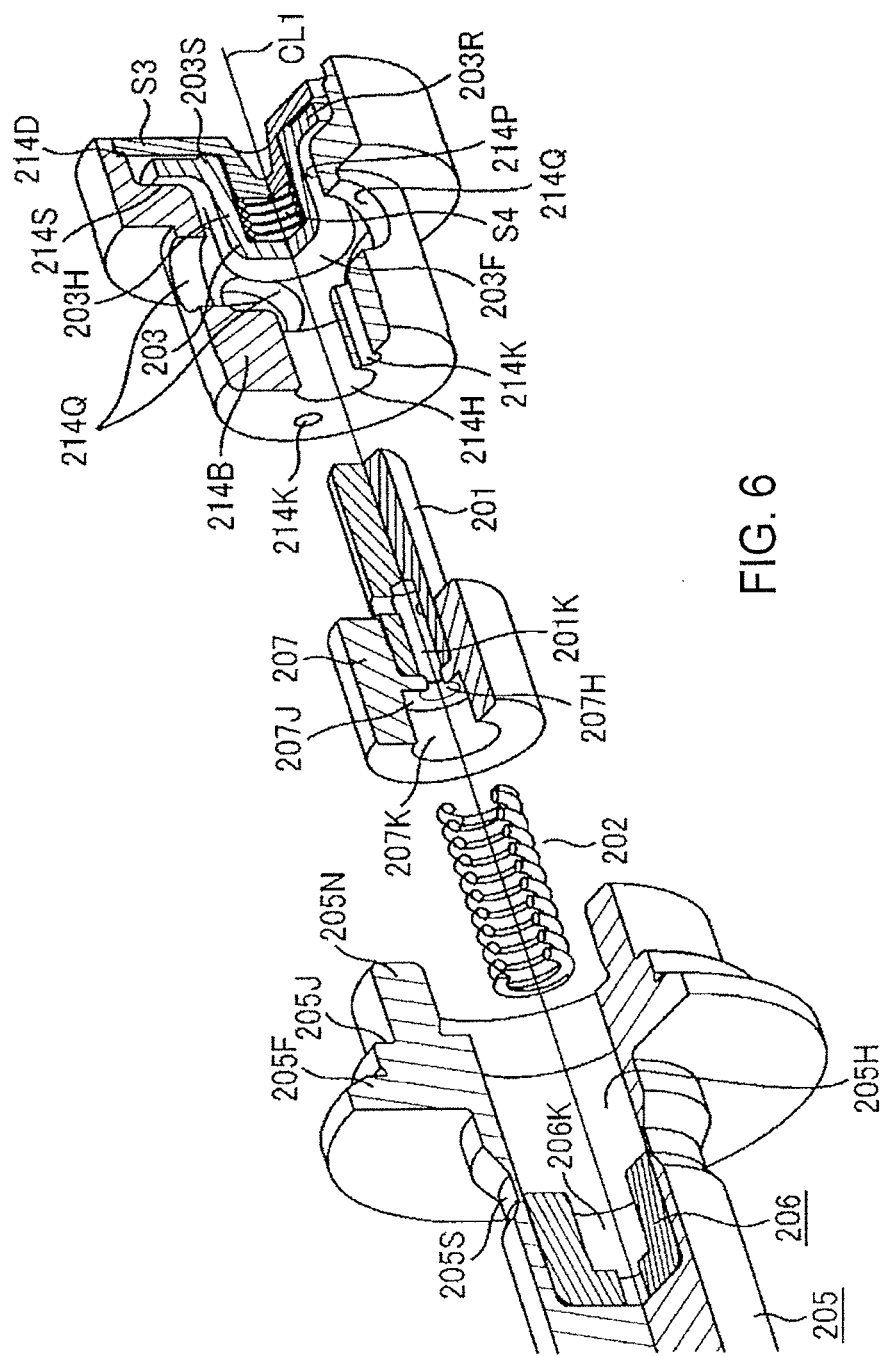
FIG. 6 is a partial sectional exploded perspective view of an electromagnetically-driven intake valve of the first embodiment of the present invention, showing a state where some parts in FIG. 5 are assembled.
Figure 7:
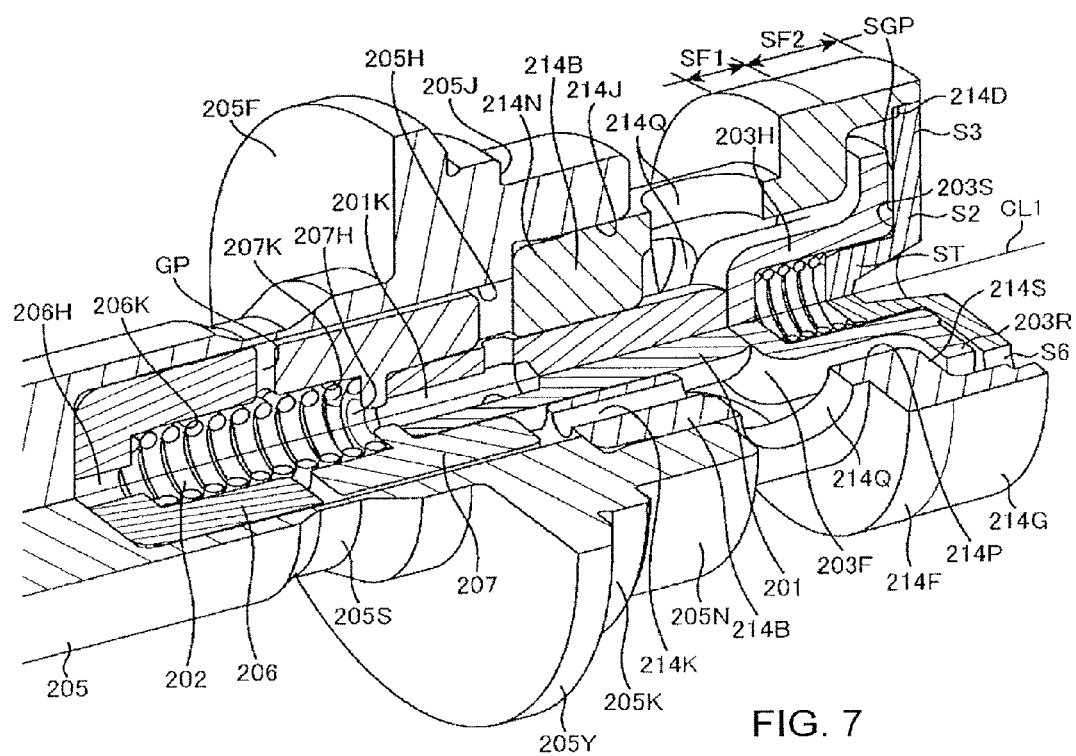
FIG. 7 is a partial sectional exploded perspective view of an electromagnetically-driven intake valve of the first embodiment of the present invention, showing an assembly completed state.

Referring to FIGS. 5 to 7, an assembly procedure for the intake valve device INV will be described as follows.

The partial sectional perspective views of FIGS. 5 to 7 each show a sectional view cut by 90° with respect to the center axis. The bottomed cylindrical fixed core 206 is inserted at its bottom side into the cylindrical space 205H at the center of the bottomed cylindrical yoke 205 and the outer periphery of the core 206 is press-fitted in and fixed to the inner peripheral surface of the cylindrical space 205H. The bottom part of the fixed core 206 is formed with a through hole 206H serving as an air relief port when the fixed core 206 is press-fitted. The fixed core 206 has a cylindrical space 206K formed inside. The open end of the fixed core 206 is positioned inside the magnetic diaphragm 205S formed at the outer periphery of the yoke 205.

The anchor 207 and the plunger rod 201 are fixed by press-fitting in advance. The anchor 207 has a partition 207J provided therein. At the center of the partition 207J is provided an opening 207H communicating between a cylindrical space 207K and the fuel passage 201K. The cylindrical space 207K is formed inside the anchor 207 to form a part of the housing space for the plunger biasing spring 202. The fuel passage 201K is formed at the center of the plunger rod 201. The plunger rod biasing spring 202 is housed in the cylindrical space 206K of the fixed core 206. A half part of the plunger rod biasing spring 202 is housed in the cylindrical space 207K, opposite the plunger rod 201, of the anchor 207 into which the plunger rod 201 is press-fitted. The outer periphery, opposite the plunger rod 201, of the anchor 207 is loosely fitted into the cylindrical space 205H of the yoke 205. The end part, opposite the plunger rod 201, of the anchor 207 faces the end surface of the fixed core 206 at the inside part of the magnetic diaphragm 205S of the yoke 205 with the magnetic clearance GR defined therebetween.

An annular flange 205F of the yoke 205 is provided with a peripheral surface 205Y press-fitted into the inner peripheral surface of the open end of the side yoke 204Y shown in FIG. 3A. Since the coil 204 is wound between the side yoke 204Y and the outer periphery of the yoke 205, the width in the radial direction of the annular flange 205F is formed in a width corresponding to that in the radial direction of the coil 204. At the side, opposite the annular flange 205F, of the fixed core 206, is provided a step 205K having a connected end surface 205J (a smaller diameter than that of the annular flange 205F) abutted against the fixing surface of the pump housing 1. From the connecting end surface 205J a cylindrical protrusion 205N having a small diameter protrudes. The cylindrical protrusion 205N is fitted in and inserted from the open end of the cylindrical insertion hole 200H of the pump housing 1 into the inside part of the cylindrical insertion hole 200H of the pump housing 1 to a position at which the connecting end surface 205J abuts against the fixing surface of the pump housing 1.

The intake valve device INV is formed in advance by assembling the valve housing 214, valve 203, valve biasing spring S4 and valve stopper S0. The cylindrical part 203H of the valve 203 is inserted into the opening 214P of the valve housing 214 and the valve 203 is assembled in such a way that the annular surface 203R of the valve 203 faces the valve seat 214S. Next, the valve biasing spring S4 is inserted into the cylindrical part 203H of the valve 203. Lastly, the protrusion ST provided with the cylindrical surface SG of the valve stopper S0 is inserted into the inner periphery of the cylindrical part 203H of the valve 203. Then the press-fitting surfaces SP1-SP3 of the valve stopper S0 are press-fitted to the annular step 214D of the valve housing to constitute the intake valve device INV.

The intake valve device INV and the electromagnetic driving mechanism EMD are integrally assembled by press-fitting and fixing the outer periphery of the bearing 214B of the valve housing 214 to the inner periphery of the cylindrical protrusion 205N of the yoke 205 to which an assembly is attached that has been assembled by the fixed core 206, plunger rod biasing spring 202, anchor 207 and plunger rod 201 in this order. Under this state, the end part, opposite the anchor 207, of the plunger rod 201 is inserted into the center bearing hole 214H of the bearing 214B and the plunger rod 201 is reciprocatably supported.

The electromagnetically-driven intake valve mechanism 200 assembled in this manner is fixed to the pump housing by press-fitting the intake valve device INV in the insertion hole 200H of the pump housing 1, inserting the electromagnetic driving mechanism EMD in the outer periphery 205X of the cylindrical protrusion 205N of the electromagnetic driving mechanism EMD, and laser-welding the outer periphery of the connecting surface 205J. In this manner, the electromagnetically driven type intake valve mechanism 200 can be formed by assembling in sequence the assembly of the plunger rod 201 and the intake valve device INV to one side inner periphery of the yoke 205 and further by assembling in sequence the coil 204 and the side yoke 204Y to the other outer periphery. As a result, the construction suitable for automation can be provided.

<Second Embodiment>

Figure 8A:
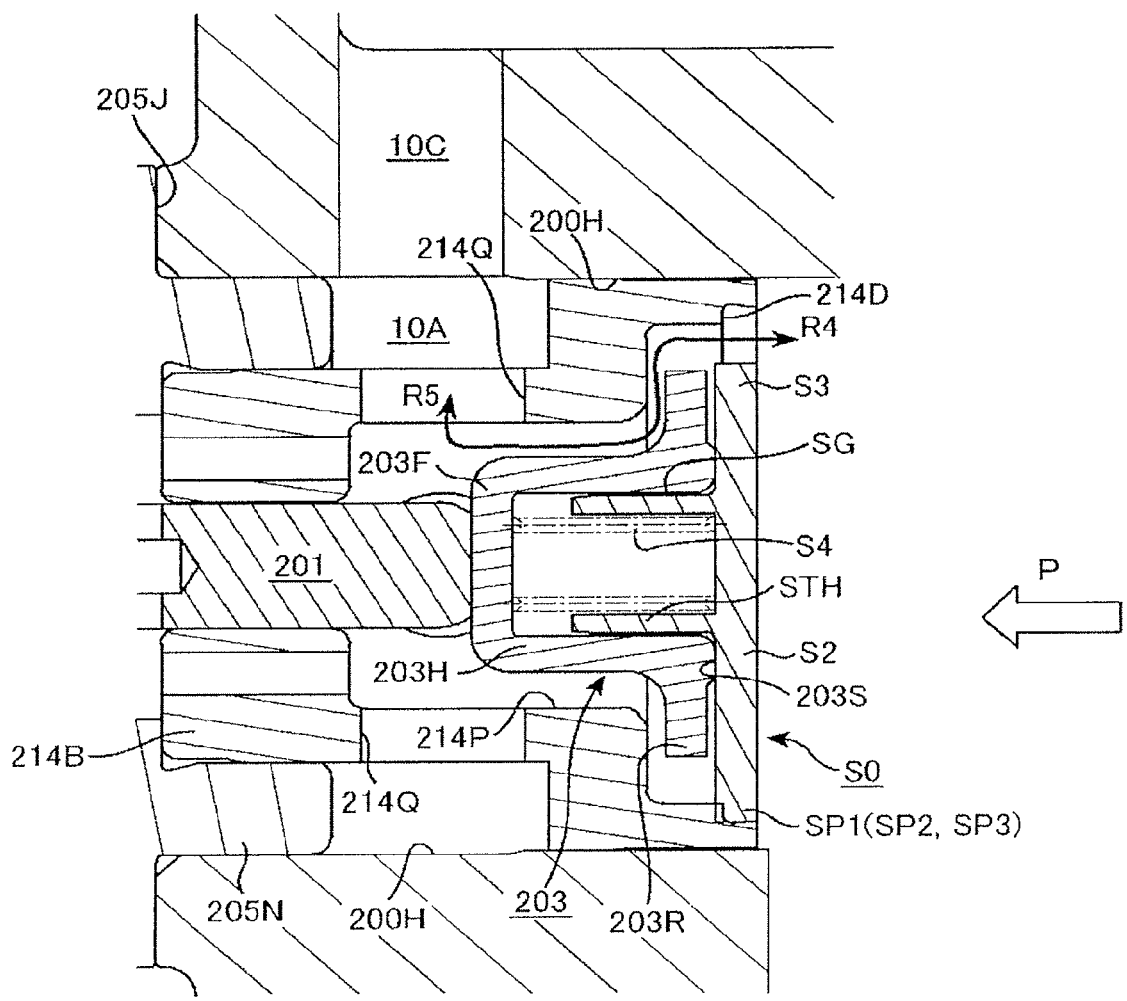
FIG. 8A is a partial enlarged sectional view of an electromagnetically-driven intake valve of a second embodiment of the present invention, showing a fuel intake state and a fuel spilled state.
Figure 8B:
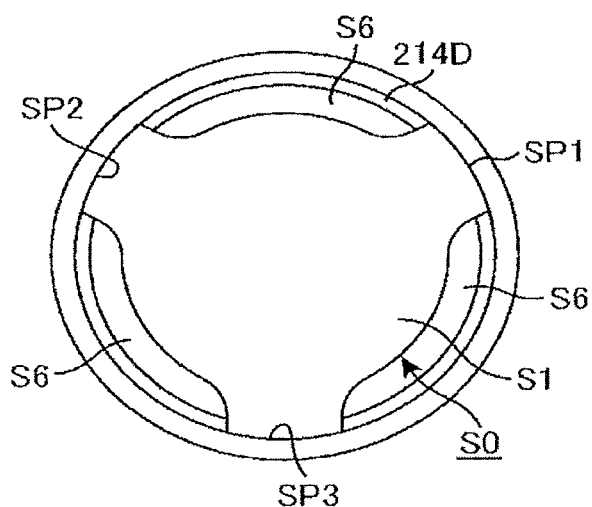
FIG. 8B shows a diagram taken in the direction of the arrow P of FIG. 8A and is a diagram taken in the direction of the arrow P of a stopper.
Figure 9:
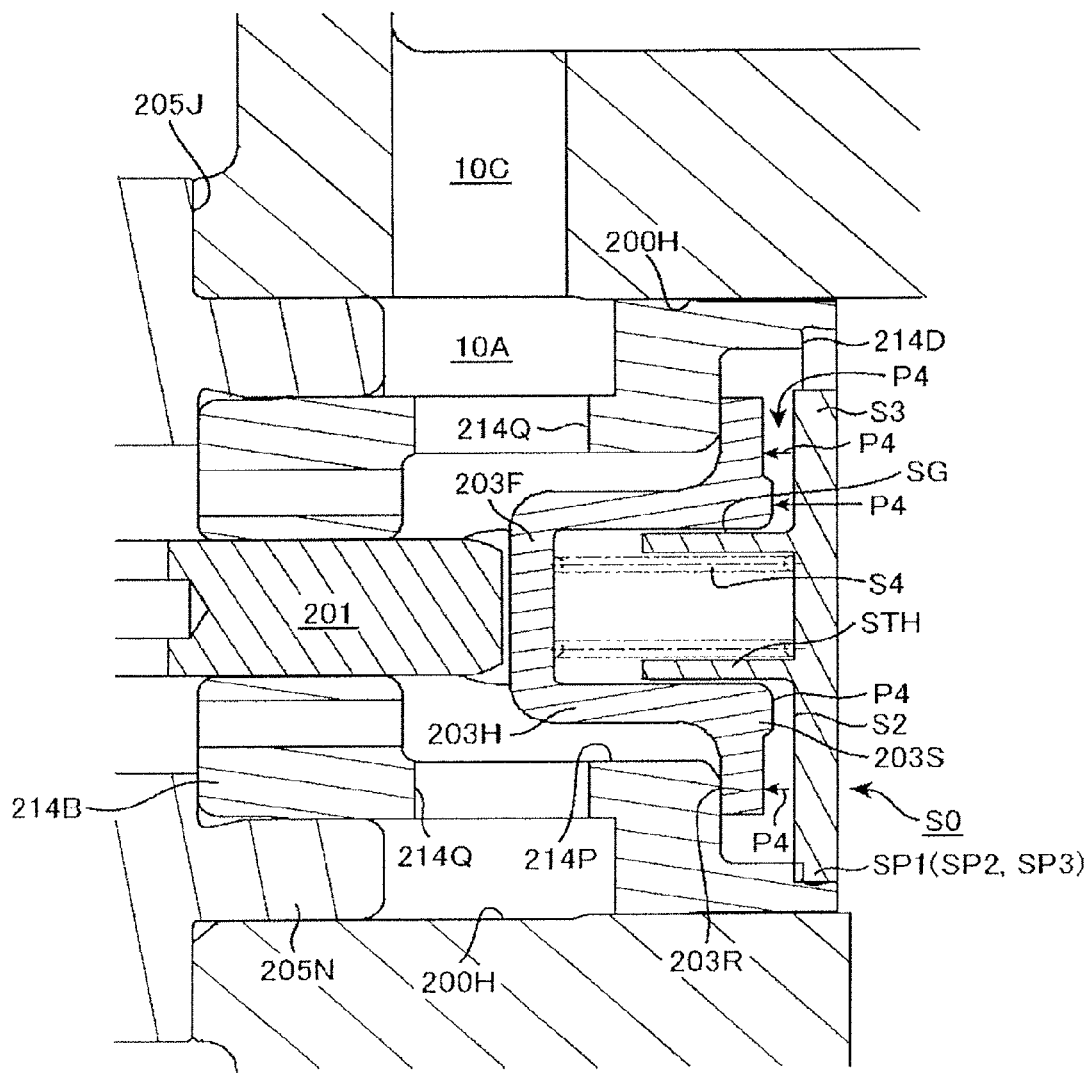
FIG. 9 is a partial enlarged sectional view of an electromagnetically-driven intake valve of the second embodiment of the present invention, showing a fuel discharged state.
Figure 10:
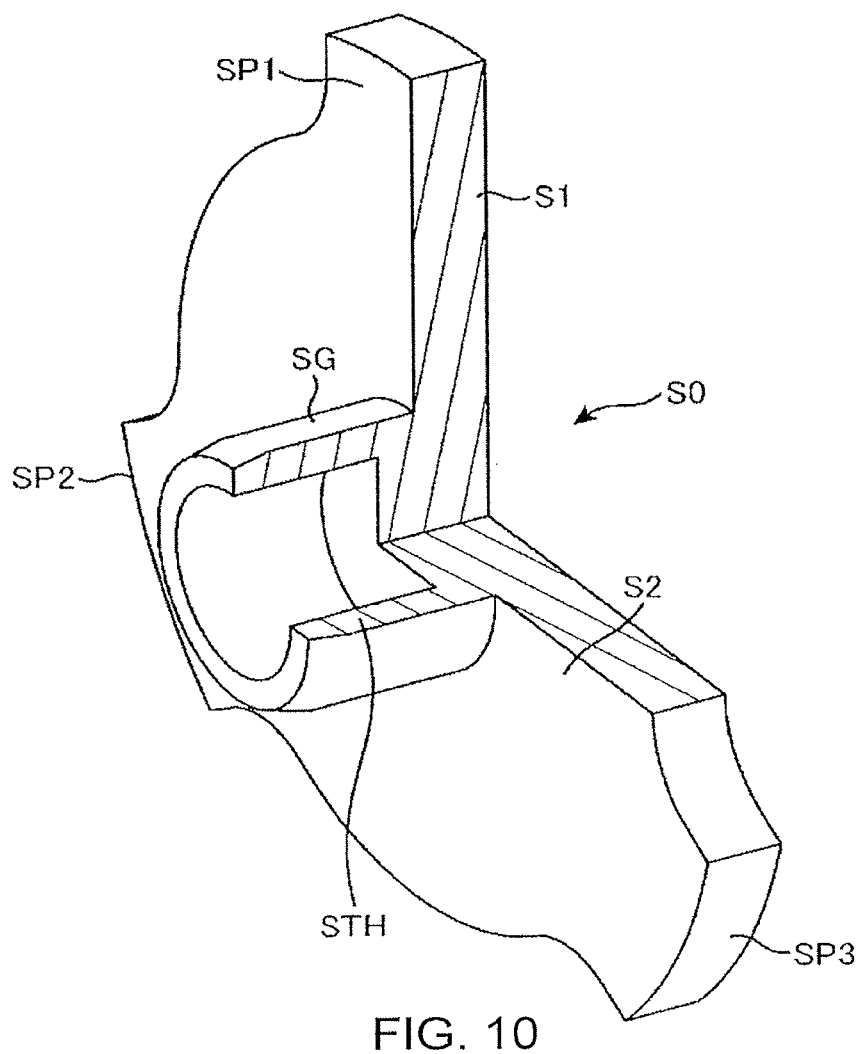
FIG. 10 is a partial enlarged sectional view of a part of the stopper of the electromagnetically-driven intake valve of the second embodiment of the present invention.

A second embodiment will be illustrated in FIGS. 8 to 10, wherein like reference numerals denote like elements. In the second embodiment, the shape of the valve stopper S0 and the configuration to provide the valve biasing spring S4 are different from those shown in the first embodiment. The valve stopper S0 includes a hollow cylindrical part STH formed at a central part thereof. The hollow cylindrical part STH extends along the inner periphery of the cylindrical part 203H of the valve 203. The valve biasing spring S4 is housed at the inner periphery of the hollow cylindrical part STH. The outer peripheral surface of the hollow cylindrical part STH is slidably contacted with the inner peripheral surface of the cylindrical part 203H of the valve 203 so as to guide the reciprocating motion of the valve 203. In this embodiment, the valve biasing spring S4 has a dimension longer than that shown in the first embodiment. Other configurations are the same as those shown in the first embodiment. FIG. 8 shows the state of fuel intake and the state of fuel spill (valve opened state) and they correspond to FIGS. 3A and 3B of the first embodiment. FIG. 8B shows a diagram taken in the direction of the arrow P of FIG. 8A and corresponds to FIG. 4B of the first embodiment. FIG. 9 shows the state of fuel discharging (a closed valve state) and corresponds to FIG. 4A of the first embodiment.

Although the first and second embodiments have described a system in which the valve seat and the valve are contacted with each other at the annular flat surface part, they can also be applied to one in which the valve seat and the valve are contacted with each other at their conical surfaces. In these embodiments, the axial size of part including the valve 203 and the valve stopper S0 can fall within several millimeters. In this embodiment, a distance from a fixing surface of the electromagnetically driven type intake valve mechanism 200 to the pump housing 1, to the end surface of the valve stopper pressurizing chamber can be made small and the high pressure pump including the electromagnetically driven type intake valve mechanism 200 can be made smaller.

Further, this embodiment can eliminate the following problems.

The problem is that when the piston plunger starts to move toward the bottom dead center (starting an intake step), the intake valve starts a valve opening motion by a spring force and a pressure across the intake valve but an area for accepting the pressure across the intake valve is made small, resulting in that the valve opening motion is delayed and shows a non-stable condition.

Further, increasing the area of the intake valve to improve responsiveness and stability of the valve opening motion causes the following problem. There is a possibility that, when the piston plunger starts an ascending motion from the bottom dead center toward the top dead center, a pressure loss generated by the spilled fuel and a fluid force become great, resulting in that the intake valve is closed at an unexpected timing.

The present embodiment has between the valve stopper and the valve an annular protrusion for forming a contact surface adapted to contact when the valve is moved to a full-opened position and an annular clearance positioned at the outer periphery of the annular protrusion. Pressure in the annular clearance positioned at the outer periphery of the annular protrusion becomes higher, along with pressure increase in the fuel pressurizing chamber, than a pressure at the low pressure fuel passage, whereby the annular clearance provides a valve closing motion assisting effect. Although there is a problem that only the use of the valve biasing spring does not provide a stable valve closing motion due to too low valve closing force of the intake valve, the present embodiment has eliminated this problem.

What is claimed is:

1. A fuel pump comprising:
a pump housing in which a pressurizing chamber is provided;
a piston plunger reciprocating within the pressurizing chamber;
an intake valve provided at an inlet of the pressurizing chamber;
a valve seat opposing one surface of the intake valve;
a valve stopper having a surface opposing an other surface of the intake valve, wherein
a first region of the valve stopper that extends radially outward a first distance is interposed between second regions of the valve stopper that extend radially outward a second distance, the second distance being longer than the first distance, so that fuel passages are formed on an outer peripheral side of the surface of the valve stopper,
a plurality of press-fitting surfaces are formed at an outer peripheral surface of the valve stopper, and
the fuel passages are formed between the plurality of press-fitting surfaces.

2. The fuel pump according to claim 1, wherein the outer peripheral surface of the valve stopper is press-fitted into a valve housing.

3. The fuel pump according to claim 1, wherein the plurality of press-fitting surfaces are press-fitted into a valve housing.

4. The fuel pump according to claim 1, wherein an outer peripheral surface diameter of the intake valve is smaller than an outer peripheral side diameter of the first region of the valve stopper.

5. The fuel pump according to claim 1, wherein
a protrusion is formed between the surface of the valve stopper and the other surface of the intake valve, and
when the intake valve is fully opened, a clearance is formed on an outer peripheral side of the protrusion.

6. The fuel pump according to claim 5, wherein the clearance is formed between the surface of the valve stopper and the other surface of the intake valve.

7. The fuel pump according to claim 5, wherein the clearance is formed annularly between the surface of the valve stopper and the other surface of the intake valve.

8. A fuel pump comprising:
an intake valve provided at an inlet of a pressurizing chamber;
a valve seat opposing one surface of the intake valve;
a valve stopper having a surface opposing an other surface of the intake valve;
a valve housing disposed outside the valve stopper, wherein
an outer peripheral surface of the valve stopper is press-fitted into the valve housing,
a first region of the valve stopper that extends radially outward a first distance is interposed between second regions of the valve stopper that extend radially outward a second distance, the second distance being longer than the first distance, so that fuel passages are formed on an outer peripheral side of the surface of the valve stopper,
a plurality of press-fitting surfaces are formed at an outer peripheral surface of the valve stopper, and
the fuel passages are formed between the plurality of press-fitting surfaces.

9. The fuel pump according to claim 8, wherein
a protrusion is formed between the surface of the valve stopper and the other surface of the intake valve, and
when the intake valve is fully opened, a clearance is formed on an outer peripheral side of the protrusion.

10. The fuel pump according to claim 9, wherein the clearance is formed between the surface of the valve stopper and the other surface of the intake valve.

11. The fuel pump according to claim 9, wherein the clearance is formed annularly between the surface of the valve stopper and the other surface of the intake valve.

* * * * *